US005877803A

United States Patent [19]
Wee et al.

[11] Patent Number: 5,877,803
[45] Date of Patent: Mar. 2, 1999

[54] 3-D IMAGE DETECTOR

[75] Inventors: Siang Tze Reginald Wee, Pasir Ris; Jie Liang, Kangang, both of Singapore

[73] Assignee: Tritech Mircoelectronics International, Ltd., Singapore, Singapore

[21] Appl. No.: 826,719

[22] Filed: Apr. 7, 1997

[51] Int. Cl.[6] .................................................. H04N 7/18
[52] U.S. Cl. ......................... 348/135; 348/153; 348/159
[58] Field of Search ............................ 348/46, 47, 48, 348/135, 136, 153, 159; 395/125; 358/87; 356/237, 394; 209/583

[56] References Cited

U.S. PATENT DOCUMENTS

| | | | |
|---|---|---|---|
| 4,636,980 | 1/1987 | Bluzer | 365/106 |
| 4,952,058 | 8/1990 | Noguchi et al. | 356/394 |
| 5,007,715 | 4/1991 | Verhulst | 350/334 |
| 5,049,963 | 9/1991 | Yamada | 357/30 |
| 5,098,191 | 3/1992 | Noguchi et al. | 356/394 |
| 5,101,269 | 3/1992 | Shelley et al. | 358/88 |
| 5,130,794 | 7/1992 | Ritchey | 358/87 |
| 5,222,477 | 6/1993 | Lia | 128/6 |
| 5,301,671 | 4/1994 | Leighton et al. | 128/654 |
| 5,311,999 | 5/1994 | Malow | 209/583 |
| 5,349,378 | 9/1994 | Maali | 348/46 |
| 5,381,784 | 1/1995 | Adair | 128/6 |
| 5,412,477 | 5/1995 | Kida | 356/394 |
| 5,416,509 | 5/1995 | Sombrowsky | 348/42 |
| 5,436,660 | 7/1995 | Sakamoto | 348/207 |
| 5,446,529 | 8/1995 | Stettner et al. | 356/4.01 |
| 5,495,576 | 2/1996 | Ritchey | 395/125 |
| 5,539,514 | 7/1996 | Shishido et al. | 356/237 |

OTHER PUBLICATIONS

VLSI Image Processing by Raymond Joffen, McGraw–Hill Book Company, New York, NY 1985, pp. 188–219.
Three Dimensional Computer Vision: A Geometric Viewpoint by Olivier Faugeras, The Mit Press, Cambridge, MA 1993, pp. 165–188.

*Primary Examiner*—Bryan Tung
*Assistant Examiner*—Tung Vo
*Attorney, Agent, or Firm*—George O. Saile; Stephen B. Ackerman; Bill Knowles

[57] ABSTRACT

A three dimensional image detector is disclosed. The three dimensional image detector has a lensing system to focus incident light reflected from an object field upon a first and second image detector. The first and second image detectors are matrices of charge coupled devices. The first and second image detectors convert the incident light to electrical signals. The electrical signals from the first and second image detectors are converted in an analog to digital converter to a plurality of digital words that represent the magnitude of the light that impinges upon the first and second image detectors. The plurality of digital words are retained in a random access memory for processing within a digital signal processor. The digital signal processor will locate an object within the object field and determine the depth and contour information of the object and present this information with the plurality of digital words to external circuitry for further processing or display. The first and second image detectors, the analog-to-digital converter, the random access memory, and the digital signal processor are to be disposed upon an integrated circuit substrate.

13 Claims, 4 Drawing Sheets

3-D IMAGE DETECTOR

BACKGROUND OF THE INVENTION

1. Field Of The Invention

This invention relates to the field of electronic image detection and more particularly to circuits and apparatus used to process digital image data to derive three dimensional information within images for further processing or display.

2. Description of Related Art

Various methods and apparatus for the capture, transmission and presentation of three dimensional (3D) imaging information using stereoscopic visualization techniques are well known in the art. However, all of the methods and apparatus examined involved complex techniques for capturing the visual information and presentation in a fashion that the human eye and brain perceived a qualitative view of the 3D view. Any quantitative depth and contour information was not preserved and measurement of said depth and contour information must be accomplished using reference standards present within the view or by the use of measurement devices. Said measurement devices often included an external energy source such as sound, fight, or radio frequency waves that are transmitted to an object of interest as impulses and the reflected energy examined to determine distance and thus depth and contour information.

There is a large body of literature exploring the projective geometry necessary to calculate the location of objects within an object field of interest. Furthermore, the algorithms necessary to calculate the depth and contour information are well understood and is presented in such literature as *Three Dimensional Computer Vision: A Geometric Viewpoint*, by Olivier Faugeras, The MIT Press Cambridge Mass., 1993.

The complexity of the algorithms for the identification of objects and the calculation of depth and contour information has required either specialized computational circuitry or extremely high performance computer systems that have obviated the integration of the light collection, light conversion, and image processing functions within image detection systems. *VLSI Image Processing*, by Raymond J. Offen, McGraw-Hill Book Company, New York, N.Y. 1985, discusses the architectures, algorithms, and computational structures required for object location and the calculation of depth and contour information within an object field.

U.S. Pat. 5,101,269 (Shelley, et al.) is an example for the viewing of stereoscopic images. The stereo images are projected upon a pair of CCD sensors. The signals from the CCD sensors are transmitted, to synchronized electronics for processing, and thence to an electronic viewer to manipulate the image to produced to provide a 3D image. The display of the image is for non-real time viewing of still images.

U.S. Pat. No. 5,007,715 (Verhulst) illustrates a device for capturing of stereoscopic images upon a CCD array and transmitting the captured image to a display device providing a 3D image. Each display of each image provides only a visual display without providing any depth or contour information.

U.S. Pat. No. 5,381,784 (Adau) describes a stereoscopic endoscope wherein light is focused on two distally disposed CCD's to provide a signal that when suitably processed and displayed upon a television monitor will provide a 3D image. The application of this patent is for viewing channels and cavities during medical procedures and does not provide any capabilities for mensuration data of depth and contour.

U.S. Pat. No. 5,222,477 (Lia) provides a system of stereoscopic viewing using a single lens and a CCD array with two apertures, each placed to one side of the optical axis of the lens. The apertures are alternately opened and closed to cause light from each aperture to successively impinge upon the CCD array. The system then processes the electrical signals fro display such that the human eye will perceive 3D images.

U.S. Pat. No. 5,416,509 (Sombrowsky) describes a method and apparatus for capturing a 3D image and displaying this image using a glass plate having elongated apertures, scanning said apertures in a manner such to preserve the perspective information, and presenting said information on a modified display.

U.S. Pat. No. 5,049,963 (Yamada) discloses a holographic television apparatus, wherein a 3D image is captured and displayed using holographic interference patterns.

U.S. Pat. No. 5,446,529 (Stettner, et al.) develop a 3D underwater laser radar imaging system, wherein an object field is scanned by an impulse of laser light. The two dimensional information is captured using a two dimensional array of light collectors and the third dimension is calculated from the time of the return of the impulse of laser light.

SUMMARY OF THE INVENTION

An object of this invention is to receive incident light reflected from an object field and preserve three dimensional depth and contour information. Another object of this invention is the location of objects within an object field. Further another object for this invention is the extraction of the three dimensional depth and contour information of objects within the object field. Still another object for this invention is the integration upon a single integrated circuit substrate of the receiving of the incident light reflected from the object field, preserving of the three dimensional depth and contour information, the locating of objects within the object field, and the extraction of the three dimensional depth and contour information.

To fulfill these and other objects, a system for the detection and presentation of depth and contour information of a three dimensional object has a first and a second array of charged coupled devices to convert the incident light to electrical signals. The first and second array of charged coupled devices are distally disposed upon an integrated circuit substrate. Incident light, reflected from the object field, impinges upon the first and second array of charged coupled devices through a light focusing means. The light focusing means has two distally disposed lenses, each with a focal plane and an optical axis. Each lens is adjusted such that its focal plane aligns with each of the first and second array of charged coupled devices and the optical axis of each lens aligns with a center point of the first and second detection means.

An analog-to-digital converter, disposed upon the integrated circuit substrate and coupled to the first and second array of charged coupled devices, converts the electrical signals from the first and second array of charged coupled devices to a first and second plurality of digital words, wherein each word represents the magnitude of incident light impinged upon each charge coupled device within the first and second detection means.

The first and second plurality of digital words are retained in a frame memory that is disposed upon the integrated circuit substrate and coupled to the analog-to-digital converter.

Finally disposed upon the integrated circuit substrate and coupled to the frame memory is a digital signal processor which will detect the presence of objects within the object field and calculate the three dimensional depth and contour information. This depth and contour information will be presented to external circuitry for display or further processing.

Detailed Description Of The Invention

Figure 1A:
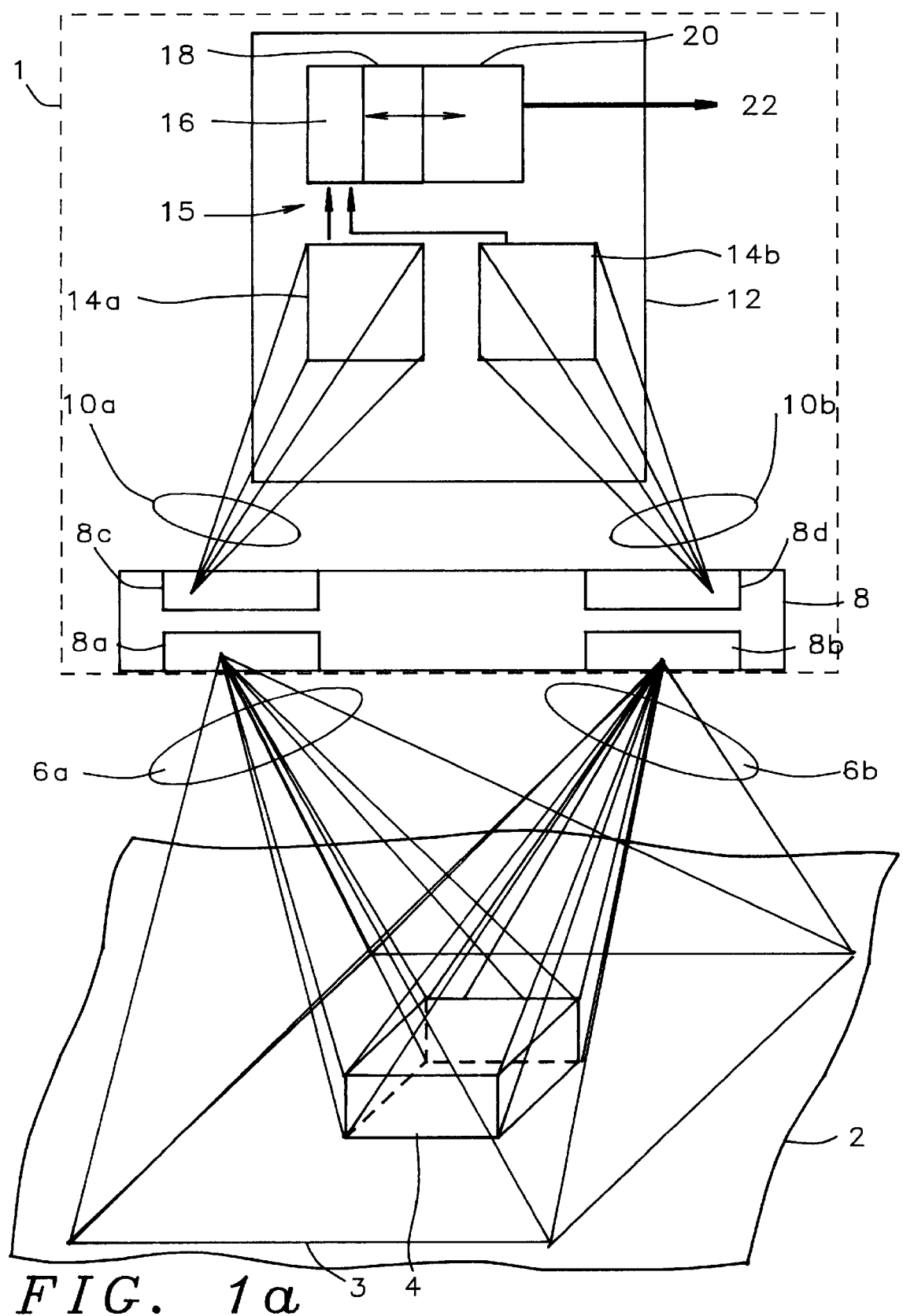
FIG. 1a shows diagramatically a system for the detection and presentation of 3D images of this invention.

FIG. 1 diagramatically shows the 3D image detection system (3D system) of this invention. The lines of reflection 6a and 6b define the object field 3 within the total world domain 2. The object field 3 is the total limit of viewable area capable of detection by the 3D system 1. At least one object 4 will occupy the object field 3.

The lines of reflectance 6a and 6b are the totality of the incident light reflected from the object field 2 and captured by the 3D system 1. These lines are transmitted through the lenses 8a and 8b into the optical subsystem 8. The optical subsystem 8 contains necessary lenses, focusing mechanisms, and prisms, to project the incident light from the object field 2 onto the matrices of CCD's 14a and 14b. The lines of reflectance 6a and 6b are transformed within the optical subsystem 8 into the lines of projection 10a and 10b as projected from the lenses 8c and 8d. The transformation and projection allows the area of each matrix of CCD's 14a and 14b to circumscribe a projection of the all of the object field 3.

The lenses 8a and 8b are distally disposed within the optical subsystem 8 such that the optical axis of each of the lenses 8a and 8b is offset from the center of the object field 3 in a manner similar to stereoscopic viewers of prior art.

Each CCD element within the matrices of CCD's 14a and 14b is composed of an optical sensor such as a photodiode and a CCD cell to act as an analog storage element for each photodiode. The charge stored in each CCD cell is proportional to the light impinging upon each cell. The CCD elements of the matrices of CCD's 14a and 14b are organized into rows and columns. Each CCD element within each column is connected to each adjacent element forming a serial shift register. The last CCD element in each of the columns of CCD's is connected to a final serial shift register.

The columns of CCD elements are synchronously shifted one element per column into a final serial shift register. The final serial shift register is then synchronously shifted to an output port to form a serial analog signal that represents the magnitude of the charge stored in each CCD element.

There is often an automatic gain control function attached to the CCD's to prevent saturation of the charge stored in each element when the magnitude of the light is sufficiently great.

The output of the final serial shift register of each of the matrices of CCD's 14a and 14b is connected to an analog-to-digital converter 16. The analog-to-digital converter 16 changes each serial analog signal from each of the matrices of CCD's 14a and 14b to a digital word representing the magnitude of the light impinging upon each picture element of the each matrix of the CCD's 14a and 14b.

Figure 1B:
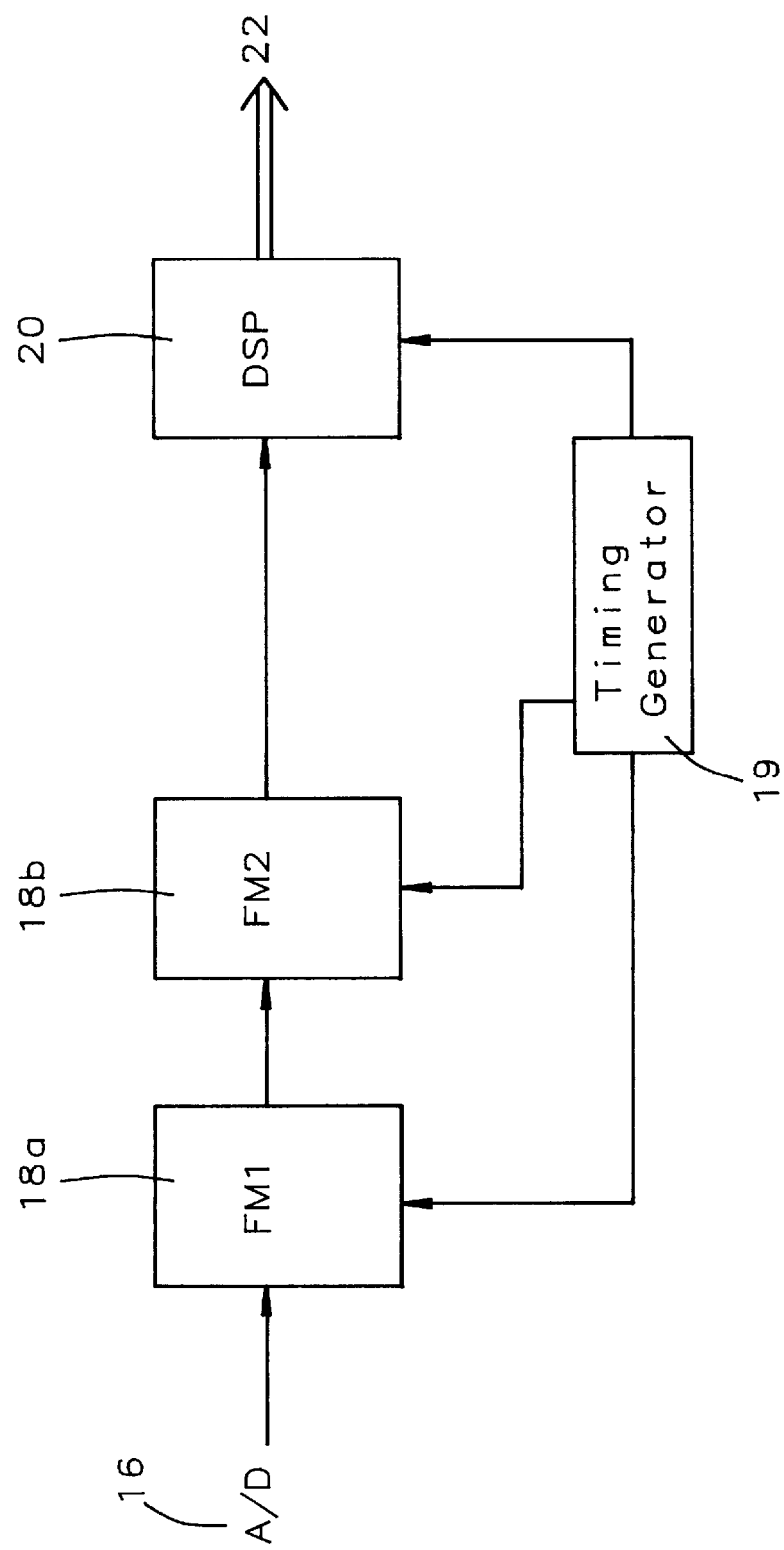
FIGS. 1b and 1c are schematic block diagrams of the frame memory and digital signal processor of this invention.

The digital code words representing the magnitude of the light impinging upon each of the picture elements are stored in a frame memory 18. The frame memory 18 is a random access memory configures as shown in FIG. 1b. Frame memory 1 18a provides for the storing of each of the digital code words that are the picture element information (pixel) as they are transmitted from the matrices of CCD's 14a and 14b of FIG. 1a through the analog-to-digital converter 16 of FIG. 1a. When frame memory 1 18a is completely filled the timing generator 19 transfers the image information from frame memory 1 18a to frame memory 2 18b for processing by the digital signal processor 20. This double buffering pipeline allows the current image present on the matrices of CCD's 14a and 14b to be transferred to the frame memory 1 18a while the digital signal processor 20 is processing the previous image from the matrices of CCD's 14a and 14b to detect an object image within the digital code words and to calculate depth and contour information.

The timing generator circuit 19 provides the necessary timing signals to store the digital code words representing the pixel information to the frame memory 1 18a, to transfer data from frame memory 1 18a to frame memory 2 18b and to provide synchronization between frame memory 3 18b and the digital signal processor 20.

Since the frame memory 1 18a and the frame memory 2 18b are updated and refreshed constantly, they can be implemented as a volatile memory in current technology this could be static random access memory (SRAM), dynamic random access memory (DRAM), or video random access memory (VRAM). Additionally, the simplicity of the structure of the frame memories 18a and 18b would permit each frame memory to be implemented as a two port memory supporting simultaneous reading and writing of data.

Returning to FIG. 1a, the digital signal processor 20 is a computation unit predesigned to locate an object 4 within the object field 3 and calculate the depth and contour information describing said object 4. The digital signal processor 20 accesses the random access memory 18 and retrieves the digital code word for each element of each matrix. The digital signal processor then uses a triangulation algorithm which compares light intensity between adjacent cells of the CCD matrices 14a and 14b and then computes the depth and contour information.

As improvements in technology permit more complex designs, the frame memory 18 would be able to retain multiple images from the CCD matrices 14a and 14b. This permits the digital signal processor to compare past and present digital codes words of the image data to create improved depth and contour information.

The depth and contour information in conjunction with the digital code words representing the two images of the object field 3 are transferred from the is digital signal processor 20 to external circuitry for further processing or display.

Figure 1C:
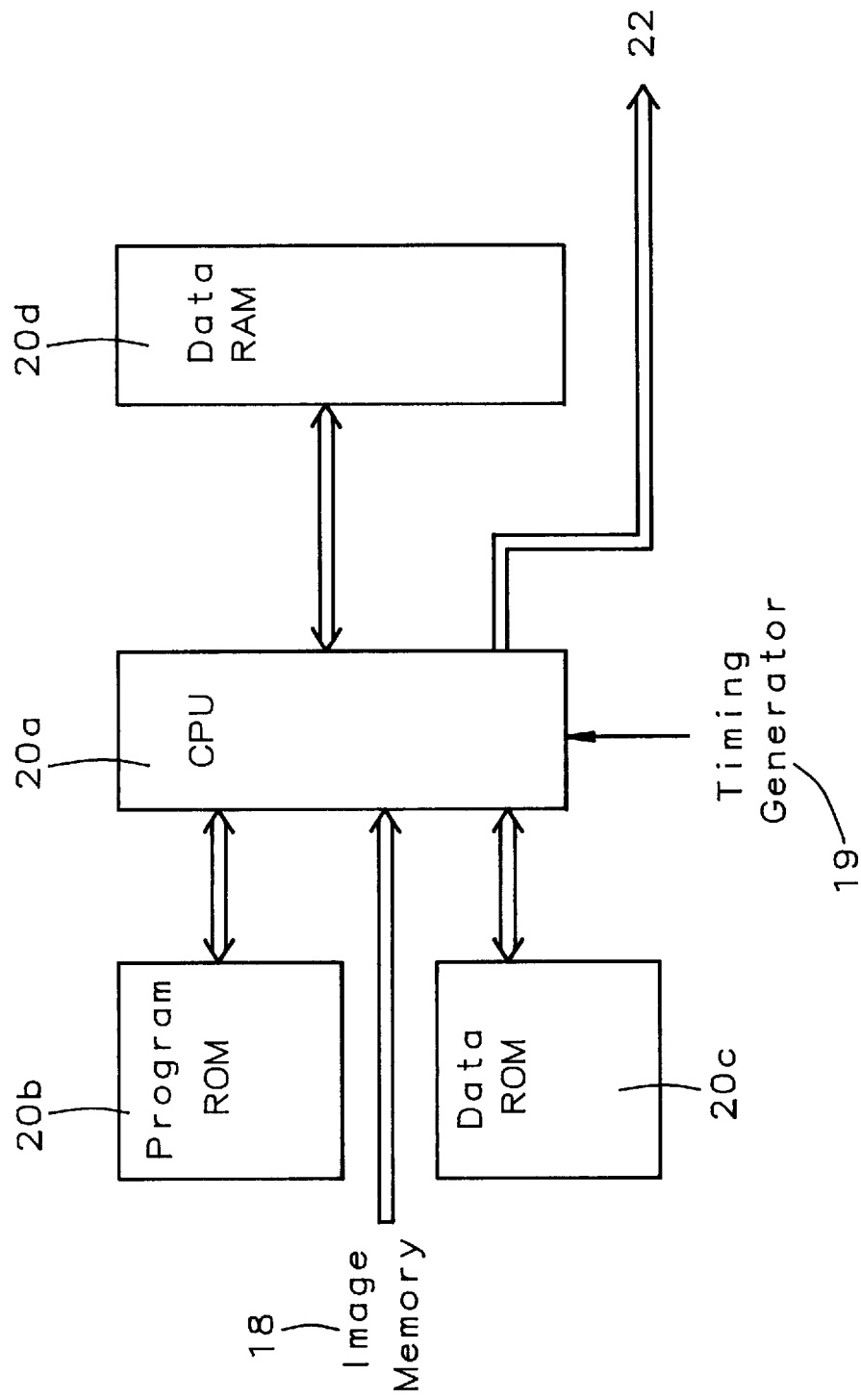

Referring now to FIG. 1c, the digital signal processor consists of a central processing unit 20a and three memory modules 20b, 20c, and 20d. There is a program read only memory (ROM) 20b for storing the instructions and instruction sequences to perform the triangulation algorithm to detect the location of an object within the image and to calculate the depth and contour information. There is a data ROM 20c for storing the signal processing coefficients necessary to perform the triangulation algorithm and to perform other signal processing algorithms such as low pass filtering and edge enhancement necessary for the detection of an object within the image field and calculation of the depth and contour information.

A data random access memory 20d will provide temporary retention of image data and intermediate processing image data while the central processing unit 20a is processing each image.

Figure 2:
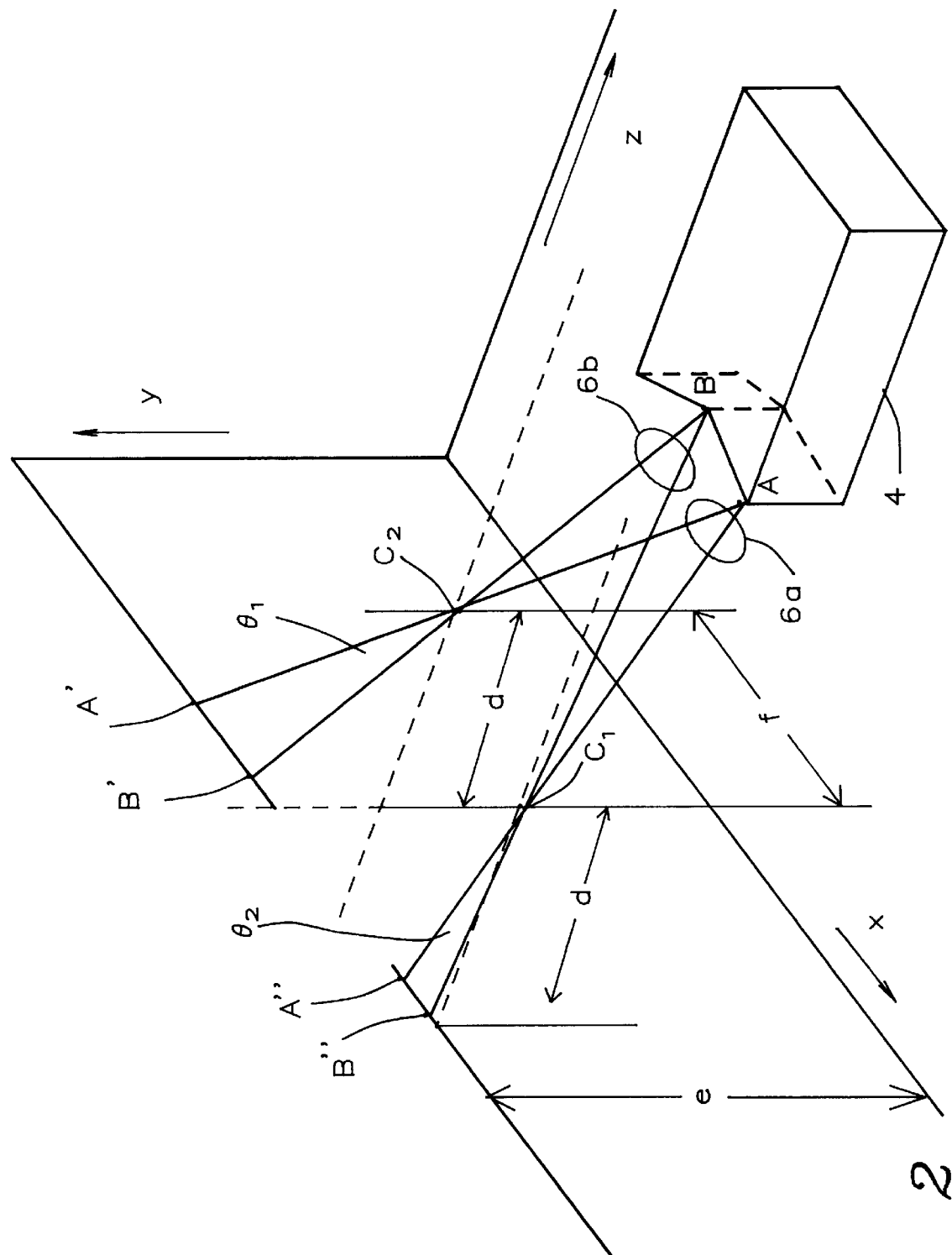
FIG. 2 illustrates the geometry employed for the calculation of the depth and contour information.

The geometry used for calculating the depth and contour information is shown in FIG. 2. The object 4 has two points A and B that are at different locations relative to the axes X, Y, and Z. The X and Y axes define the retinal plane that is aligned with he matrices of CCD's 14a and 14b of FIG. 1 The point $C_1$ is the center for the lens 8a of FIG. 1 and the point $C_2$ is the center for the lens 8b of FIG. 1. The optical subsystem 8 of FIG. 1 has a an optical length d that is the effective distance from the retinal plane to the center of the lenses $C_1$ and $C_2$. The lenses are at a distance f apart and a distance e on the Y axis from the X axis.

The points A and B respectively form the projection points A', A", and B', B" upon the retinal plane as projected by the lines of reflectance 6a and 6b.

While this invention has been particularly shown and described with reference to the preferred embodiments thereof, it will be understood by those skilled in the art that various changes in form and details may be made without departing from the spirit and scope of the invention.

What is claimed is:

1. A system for the detection and presentation of depth and contour information of a three dimensional object within an object field having at least one object, wherein said three dimensional object has a first dimension, a second dimension, and a third dimension, comprising:
   a) a first detection means to convert light impinged upon said first array to a first electrical signal representing the magnitude of said light, wherein said first detection means is disposed upon an integrated circuit substrate;
   b) a second detection means to convert light impinged upon said second array to a second electrical signal representing the magnitude of said light, wherein said second detection means is disposed upon an integrated circuit substrate;
   c) a light focusing means to receive an incident light that is reflected from the object field;
   d) a signal conversion means coupled to the first and'second detection means and disposed upon the integrated circuit substrate, to convert the first and second electrical signals to a first and second plurality of digital words, wherein each digital word represents the magnitude of light impinged upon each charge coupled device of the first and second array of charged coupled devices;
   e) a retaining means coupled to the signal conversion means and disposed upon the integrated circuit substrate to retain the first and second plurality of digital words; and
   f) a digital signal processing means coupled to the retaining means and to external circuitry and disposed upon the integrated circuit substrate to process said first and second plurality of digital words to detect said three dimensional object within the object field and to calculate depth and contour information of said three dimensional object, and to present said depth and contour information of said three dimensional object and said first and second plurality of digital words for further processing and display.

2. The system of claim 1 wherein the first and second detection means matrices of charge coupled devices.

3. The system of claim 1 wherein said focusing means includes:

a) a first lens, having a first retinal pane and a first optical axis, to focus said incident light upon the first detection means;
   b) a second lens, having a second retinal pane and a second optical axis, to focus said incident light upon the second detection means; and
   c) a lens focus adjustment mechanism to superimpose the first retinal plane upon the first detection means, and the second retinal plane upon the second detection means and to align the first optical axis with a first middle point of the first detection means and the second optical axis with a second middle point of the second detection means.

4. The system of claim 1 wherein said retaining means comprises:
   a) a first frame memory to receive a first set of the first and second plurality of digital words from said signal conversion means;
   b) a second frame memory coupled to said first frame memory and to said digital processing means to receive and to retain said first set of the first and second plurality of digital words, and to transfer said first set of first and second plurality of digital words to the digital signal processing means to be processed; and
   c) a timing generation means to create a plurality of timing signals wherein said plurality of timing signals comprises:
      a first timing signal to instruct the first frame memory to transfer the first set of first and second digital words to the second frame memory,
      a second timing signal to instruct the first frame memory to transfer the second set of first and second digital word to the first frame memory from the signal conversion means, and
      a third timing signal to instruct the second frame memory to transfer the first set of first and second digital words to the digital signal processing means to be processed.

5. The system of claim 1 wherein the digital signal processing means comprises:
   a) a program storage means to retain a set of instructions and an ordering of said set of instructions necessary to process said first and second plurality of digital words;
   b) a processing unit, coupled to said program storage means, to said retaining means, and to said external circuitry, to execute said instructions upon said first and second digital words, wherein said set of instructions will implement a triangulation algorithm by comparing each digital word of the first plurality of digital words to each corresponding digital word of the second plurality of digital words to detect and to calculate said depth and contour information of said three dimensional object;
   c) a constant storage means couple to said processing unit to retain a set of constant values necessary to implement said triangulation algorithm; and
   d) a temporary storage means coupled to the processing unit to retain intermediate values during execution of said set of instructions.

6. A measurement apparatus to detect an object within an object field and to calculate depth and contour information of said object, comprising
   a) a first detection means constituted of a first matrix of charge coupled devices to convert light impinged upon said first array to a first electrical signal representing the magnitude of said light, wherein said first detection means is disposed upon an integrated circuit substrate;

b) a second detection means constituted of a second matrix of charge coupled devices to convert light impinged upon said second array to a second electrical signal representing the magnitude of said light, wherein said second detection means is disposed upon an integrated circuit substrate;

c) a light focusing means to receive an incident light that is reflected from the object field;

d) a signal conversion means coupled to the first and second detection means and disposed upon the integrated circuit substrate, to convert the first and second electrical signals to a first and second plurality of digital words, wherein each digital word represents the magnitude of light impinged upon each charge coupled device of the first and second array of charged coupled devices;

e) a retaining means coupled to the signal conversion means and disposed upon the integrated circuit substrate to retain the first and second plurality of digital words; and f) a digital signal processing means coupled to the retaining means and to eternal circuitry and disposed upon the integrated circuit substrate to process said first and second plurality of digital words to detect said three dimensional object within the object field and to calculate depth and contour information of said three dimensional object, and to present said depth and contour information of said three dimensional object and said first and second plurality of digital words for further processing and display.

7. The apparatus of claim 6 wherein said focusing means includes:

a) a first lens, having a first retinal pane and a first optical axis, to focus said incident light upon the first detection means;

b) a second lens, having a second retinal pane and a second optical axis, to focus said incident light upon the second detection means; and c) a lens focus adjustment mechanism to superimpose the first retinal plane upon the first detection means, and the second retinal plane upon the second detection means and to align the first optical axis with a first middle point of the first detection means and the second optical axis with a second middle point of the second detection means.

8. The apparatus of claim 6 wherein said retaining means comprises:

a) a first frame memory to receive a first set of the first and second plurality of digital words from said signal conversion means;

b) a second frame memory coupled to said first frame memory and to said digital processing means to receive and to retain said first set of the first and second plurality of digital words, and to transfer said first set of first and second plurality of digital words to the digital signal processing means to be processed; and c) a timing generation means to create a plurality of timing signals wherein said plurality of timing signals comprises:

a first timing signal to instruct the first frame memory to transfer the first set of first and second digital words to the second frame memory, and a second timing signal to instruct the first frame memory to transfer the second set of first and second digital word to the first frame memory from the signal conversion means a third timing signal to instruct the second frame memory to transfer the first set of first and second digital words to the digital signal processing means to be processed.

9. The apparatus of claim 6 wherein the digital signal processing means comprises:

a) a program storage means to retain a set of instructions and an ordering of said set of instructions necessary to process said first and second plurality of digital words;

b) a processing unit, coupled to said program storage means, to said retaining means, and to said external circuitry, to execute said instructions upon said first and second digital words, wherein said set of instructions will implement a triangulation algorithm by comparing each digital word of the first plurality of digital words to each corresponding digital word of the second plurality of digital words to detect and to calculate said depth and contour information of said three dimensional object;

c) a constant storage means couple to said processing unit to retain a set of constant values necessary to implement said triangulation algorithm; and d) a temporary storage means coupled to the processing unit to retain intermediate values during execution of said set of instructions.

10. A circuit to detect a three dimensional object within an object field having at least one three dimensional object, to calculate depth and contour information describing said three dimensional object and to present said depth and contour information to external circuitry for processing and display, comprising:

a) a first detection means constituted of a first matrix of charge coupled devices to convert light impinged upon said first array to a first electrical signal representing the magnitude of said light, wherein said first detection means is disposed upon an integrated circuit substrate;

b) a second detection means constituted of a second matrix of charge coupled devices to convert light impinged upon said second array to a second electrical signal representing the magnitude of said light, wherein said second detection means is disposed upon an integrated circuit substrate;

c) a analog-to-digital converter coupled to the first and second detection means and disposed upon the integrated circuit substrate, to convert the first and second electrical signals to a first and second plurality of digital words, wherein each digital word represents the magnitude of light impinged upon each charge coupled device of the first and second array of charged coupled devices;

d) a random access memory coupled to the analog-to-digital converter and disposed upon the integrated circuit substrate to retain the first and second plurality of digital words; and e) a digital signal processing means coupled to the retaining means and to external circuitry and disposed upon the integrated circuit substrate to process said first and second plurality of digital words to detect said three dimensional object within the object field and to calculate depth and contour information of said three dimensional object, and to present said depth and contour information of said three dimensional object and said first and second plurality of digital words for further processing and display.

11. The circuit of claim 10 wherein a light focusing means receives incident light that is reflected from the object field and focuses said incident light upon said first and second detection means, comprising:

a) a first lens, having a first retinal pane and a first optical axis, to focus said incident light upon the first detection means;

b) a second lens, having a second retinal pane and a second optical axis, to focus said incident light upon the second detection means; and c) a lens focus adjustment mechanism to superimpose the first retinal plane upon the first detection means, and the second retinal plane upon the second detection means and to align the first optical axis with a first middle point of the first detection means and the second optical axis with a second middle point of the second detection means.

12. The circuit of claim 10 wherein said retaining means comprises:

a) a first frame memory to receive a first set of the first and second plurality of digital words from said signal conversion means;

b) a second frame memory coupled to said first frame memory and to said digital processing means to receive and to retain said first set of the first and second plurality of digital words, and to transfer said first set of first and second plurality of digital words to the digital signal processing means to be processed; and c) a timing generation means to create a plurality of timing signals wherein said plurality of timing signal comprises:

a first timing signal to instruct the first frame memory to transfer the first set of first and second digital words to the second frame memory, a second timing signal to instruct the first frame memory to transfer the second set of first and second digital word to the first frame memory from the signal conversion means, and a third timing signal to instruct the second frame memory to transfer the first set of first and second digital words to the digital signal processing means to be processed.

13. The circuit of claim 10 wherein the digital signal processing means comprises:

a) a program storage means to retain a set of instructions and an ordering of said set of instructions necessary to process said first and second plurality of digital words;

b) a processing unit, coupled to said program storage means, to said retaining means, and to said external circuitry, to execute said instructions upon said first and second digital words, wherein said set of instructions will implement a triangulation algorithm by comparing each digital word of the first plurality of digital words to each corresponding digital word of the second plurality of digital words to detect and to calculate said depth and contour information of said three dimensional object;

c) a constant storage means couple to said processing unit to retain a set of constant values necessary to implement said triangulation algorithm; and d) a temporary storage means coupled to the processing unit to retain intermediate values during execution of said set of instructions.

* * * * *